United States Patent
Lee et al.

(10) Patent No.: US 12,462,980 B2
(45) Date of Patent: Nov. 4, 2025

(54) MULTILAYER ELECTRONIC COMPONENT

(71) Applicant: SAMSUNG ELECTRO-MECHANICS CO., LTD., Suwon-si (KR)

(72) Inventors: Kangha Lee, Suwon-si (KR); Yoona Park, Suwon-si (KR); So Eun Choi, Suwon-si (KR); Eun Byeol Choi, Suwon-si (KR); Chul Seung Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 161 days.

(21) Appl. No.: 18/375,311

(22) Filed: Sep. 29, 2023

(65) Prior Publication Data

US 2024/0177933 A1    May 30, 2024

(30) Foreign Application Priority Data

Nov. 24, 2022    (KR) .................. 10-2022-0158854

(51) Int. Cl.
    *H01G 4/232*    (2006.01)
    *H01G 4/248*    (2006.01)
    *H01G 4/30*    (2006.01)

(52) U.S. Cl.
    CPC ............. *H01G 4/2325* (2013.01); *H01G 4/30* (2013.01); *H01G 4/248* (2013.01)

(58) Field of Classification Search
    CPC ......... H01G 4/2325; H01G 4/30; H01G 4/248
    See application file for complete search history.

(56) References Cited

U.S. PATENT DOCUMENTS

| | | | |
|---|---|---|---|
| 10,658,117 B2 * | 5/2020 | Kim ..................... | H01G 4/30 |
| 2001/0043454 A1 | 11/2001 | Yoshii et al. | |

(Continued)

FOREIGN PATENT DOCUMENTS

| | | |
|---|---|---|
| JP | H8-017137 B2 | 2/1996 |
| JP | 2001-307947 A | 11/2001 |

(Continued)

OTHER PUBLICATIONS

Extended European Search Report issued in corresponding European Patent Application No. 23198781.9 dated Oct. 25, 2024.

*Primary Examiner* — Michael P McFadden
(74) *Attorney, Agent, or Firm* — MORGAN, LEWIS & BOCKIUS LLP

(57) ABSTRACT

A multilayer electronic component, in which the first external electrode may include the 1-1-th electrode layer disposed on the third surface, and the 1-2-th electrode layer disposed on the first and second surfaces, and the second external electrode may include the 2-1-th electrode layer disposed on the fourth surface and the 2-2-th electrode layer disposed on the first and second surfaces, wherein the 1-2-th electrode layer and the 2-2-th electrode layer include Cu and a first additive element having a content lower than a content of the Cu, the contents of the first additive element included in the 1-2-th electrode layer and the 2-2-th electrode layer are greater than the contents of the first additive element included in the 1-1-th electrode layer and the 2-1-th electrode layer, respectively, and the first additive element is at least one selected from Ag and Al, thereby preventing cracks and improving moisture resistance reliability.

12 Claims, 5 Drawing Sheets

(56) References Cited

U.S. PATENT DOCUMENTS

| | | | |
|---|---|---|---|
| 2008/0239617 A1 | 10/2008 | Motoki et al. | |
| 2009/0323253 A1 | 12/2009 | Kobayashi et al. | |
| 2010/0118467 A1 | 5/2010 | Takeuchi et al. | |
| 2015/0223340 A1* | 8/2015 | Jung | H01G 4/008 156/89.12 |
| 2015/0279567 A1 | 10/2015 | Nishisaka et al. | |
| 2018/0114644 A1* | 4/2018 | Sugita | H01G 4/12 |
| 2021/0343475 A1 | 11/2021 | Takeuchi | |
| 2022/0189699 A1* | 6/2022 | Nomura | H01G 4/1218 |

FOREIGN PATENT DOCUMENTS

| | | |
|---|---|---|
| JP | 2021-100021 A | 7/2021 |
| JP | 2021-176181 A | 11/2021 |

\* cited by examiner

MULTILAYER ELECTRONIC COMPONENT

CROSS-REFERENCE TO RELATED APPLICATION(S)

This application claims benefit of priority to Korean Patent Application No. 10-2022-0158854 filed on Nov. 24, 2022 in the Korean Intellectual Property Office, the disclosure of which is incorporated herein by reference in its entirety.

TECHNICAL FIELD

The present disclosure relates to a multilayer electronic component.

A Multilayer Ceramic Capacitor (MLCC), a multilayer electronic component, is a chip-type capacitor mounted on the printed circuit boards of various electronic products including video display devices such as liquid crystal displays (LCDs) and plasma display panels (PDPs), computers, smartphones, and mobile phones, to serve to charge or discharge electricity.

Multilayer ceramic capacitors may be used as components of various electronic devices due to the advantages of being small, high capacitance guaranteed, and easy to mount. As various electronic devices such as computers and mobile devices are miniaturized and high-powered, the demand for miniaturization and high capacitance multilayer ceramic capacitors is increasing. In accordance with the miniaturization and high capacitance trend of multilayer ceramic capacitors, the importance of increasing the capacitance per unit volume of multilayer ceramic capacitors is increasing.

Recently, with the advent of foldable smartphones and wearable devices, multilayer ceramic capacitors are required to have high resistance to external stress caused by deformation of a substrate or the like. If the multilayer ceramic capacitor does not have resistance to stress, moisture resistance and high-temperature reliability may deteriorate due to cracks.

Accordingly, to protect the multilayer ceramic capacitor from external stress, in the related art, a method of applying a conductive resin layer containing metal particles and resin to external electrodes of the multilayer ceramic capacitor has been proposed. However, the conductive resin layer may increase equivalent series resistance (ESR) due to high resistance thereof, thereby reducing power efficiency of the multilayer ceramic capacitor or increasing heat generation, and there is a problem of a limit to thin layering.

Therefore, there is a need for research into the structure of an external electrode capable of preventing crack generation by having high resistance to external stress without applying a conductive resin layer to the external electrode.

SUMMARY

An aspect of the present disclosure is to prevent cracks from occurring in the body due to external stress.

An aspect of the present disclosure is to improve moisture resistance reliability of multilayer electronic components.

An aspect of the present disclosure is to prevent hydrogen generated in the plating process from penetrating into the body.

According to an aspect of the present disclosure, a multilayer electronic component includes a body including a dielectric layer and first and second internal electrodes alternately disposed with the dielectric layer interposed therebetween, and having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction; a first external electrode including a 1-1-th electrode layer disposed on the third surface, and a 1-2-th electrode layer disposed on the first and second surfaces and connected to the 1-1-th electrode layer; and a second external electrode including a 2-1-th electrode layer disposed on the fourth surface and a 2-2-th electrode layer disposed on the first and second surfaces and connected to the 2-1-th electrode layer. The 1-2-th electrode layer and the 2-2-th electrode layer include Cu and a first additive element having a content lower than a content of the Cu, the content of the first additive element included in the 1-2-th electrode layer is greater than the content of the first additive element included in the 1-1-th electrode layer, and the content of the first additive element included in the 2-2-th electrode layer is greater than the content of the first additive element included in the 2-1-th electrode layer, and the first additive element is at least one selected from Ag and Al.

According to an aspect of the present disclosure, a multilayer electronic component includes a body including a dielectric layer and first and second internal electrodes alternately disposed with the dielectric layer interposed therebetween, and having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction; a first external electrode including a 1-1-th electrode layer disposed on the third surface, and a 1-2-th electrode layer disposed on the first and second surfaces and connected to the 1-1-th electrode layer; and a second external electrode including a 2-1-th electrode layer disposed on the fourth surface, and a 2-2-th electrode layer disposed on the first and second surfaces and connected to the 2-1-th electrode layer. The 1-1-th electrode layer and the 2-1-th electrode layer are disposed between an extension line of the first surface and an extension line of the second surface, the 1-1-th electrode layer includes a region not covered by the 1-2-th electrode layer on the third surface, the 2-1-th electrode layer includes a region not covered by the 2-2-th electrode layer on the fourth surface, and the 1-2-th electrode layer and the 2-2-th electrode layer each contain at least one of Ag and Al.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
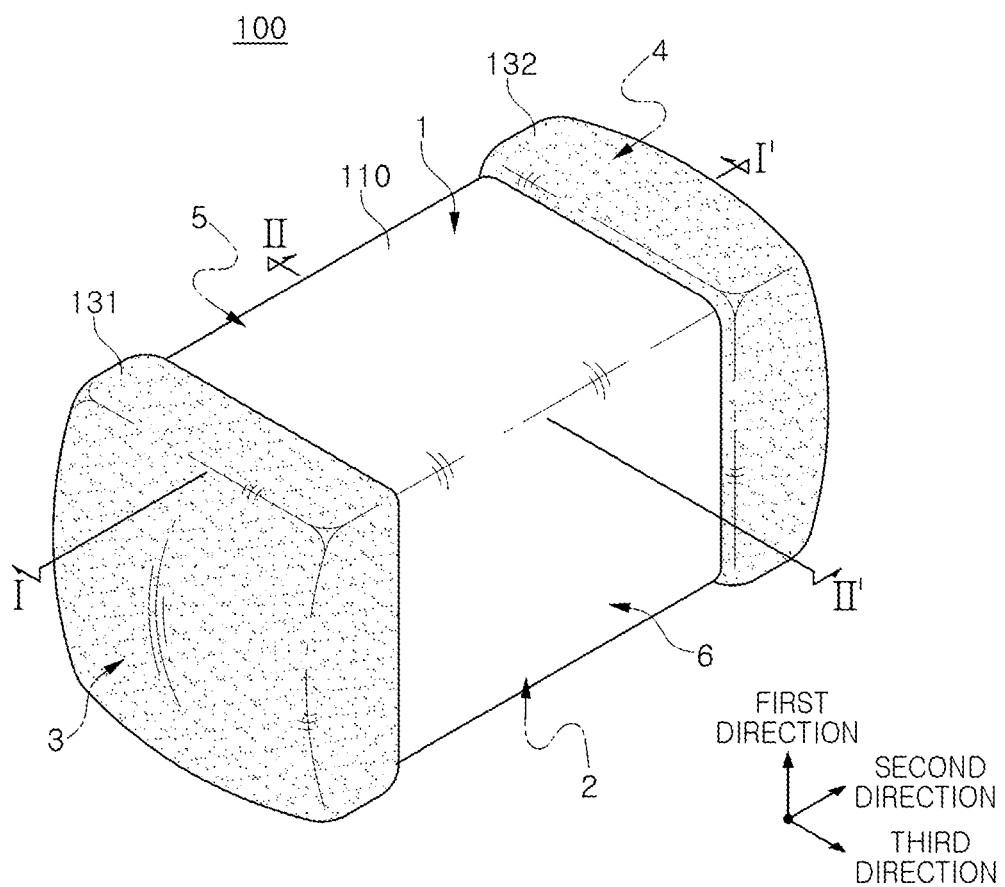
FIG. 1 is a perspective view schematically illustrating a multilayer electronic component according to an embodiment.

Hereinafter, embodiments of the present disclosure will be described with reference to detailed embodiments and accompanying drawings. However, the embodiments of the present disclosure may be modified in many different forms, and the scope of the present disclosure is not limited to the embodiments described below. In addition, the embodiments of the present disclosure are provided to more completely describe the present disclosure to those skilled in the art. Therefore, the shape and size of elements in the drawings may be exaggerated for clearer explanation, and elements indicated by the same reference numerals in the drawings are the same elements.

In addition, to clearly describe the present disclosure in the drawings, parts irrelevant to the description are omitted, and the size and thickness of each component illustrated in the drawings are arbitrarily illustrated for convenience of description, and thus, the present disclosure is not necessarily limited to the illustrated embodiment. Also, components having the same function within the scope of the same concept are described using the same reference numerals. Furthermore, throughout the specification, when a certain component is said to "include," it means that it may further include other components without excluding other components unless otherwise stated.

In the drawings, the first direction may be defined as the thickness (T) direction, the second direction may be defined as the length (L) direction, and the third direction may be defined as the width (W) direction.

FIG. 1 is a perspective view schematically illustrating a multilayer electronic component according to an embodiment.

Figure 2:
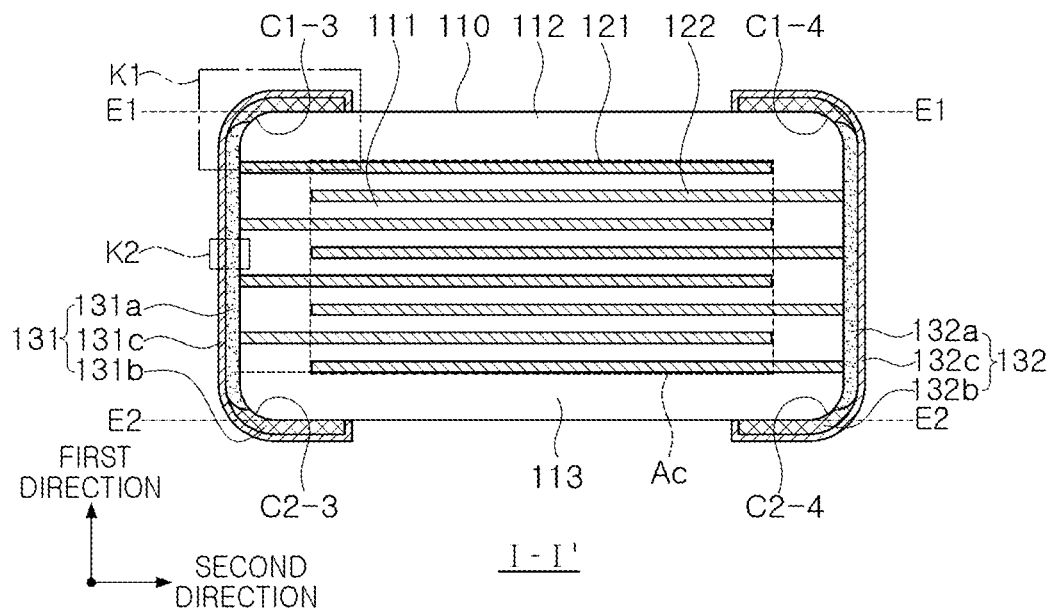
FIG. 2 is a cross-sectional view schematically illustrating a section taken along line I-I' of FIG. 1.

FIG. 2 is a cross-sectional view schematically illustrating a section taken along line I-I' of FIG. 1.

Figure 3:
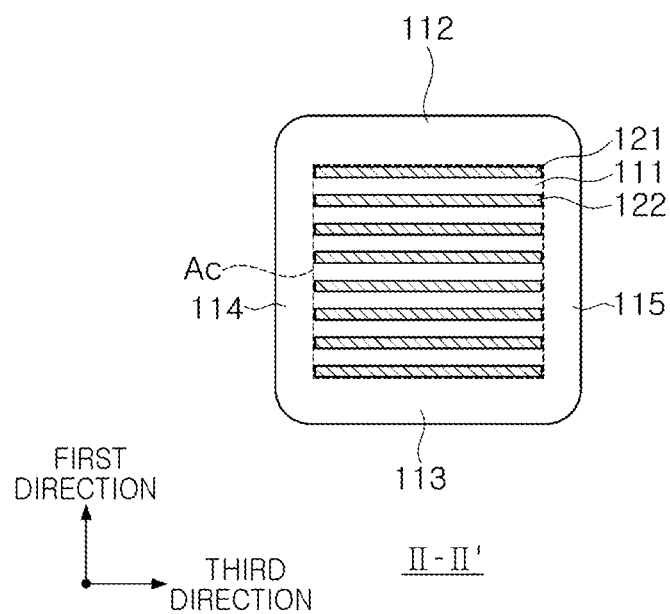
FIG. 3 is a cross-sectional view schematically illustrating a section taken along line II-II' of FIG. 1.

FIG. 3 is a cross-sectional view schematically illustrating a section taken along line II-II' of FIG. 1.

Figure 4:
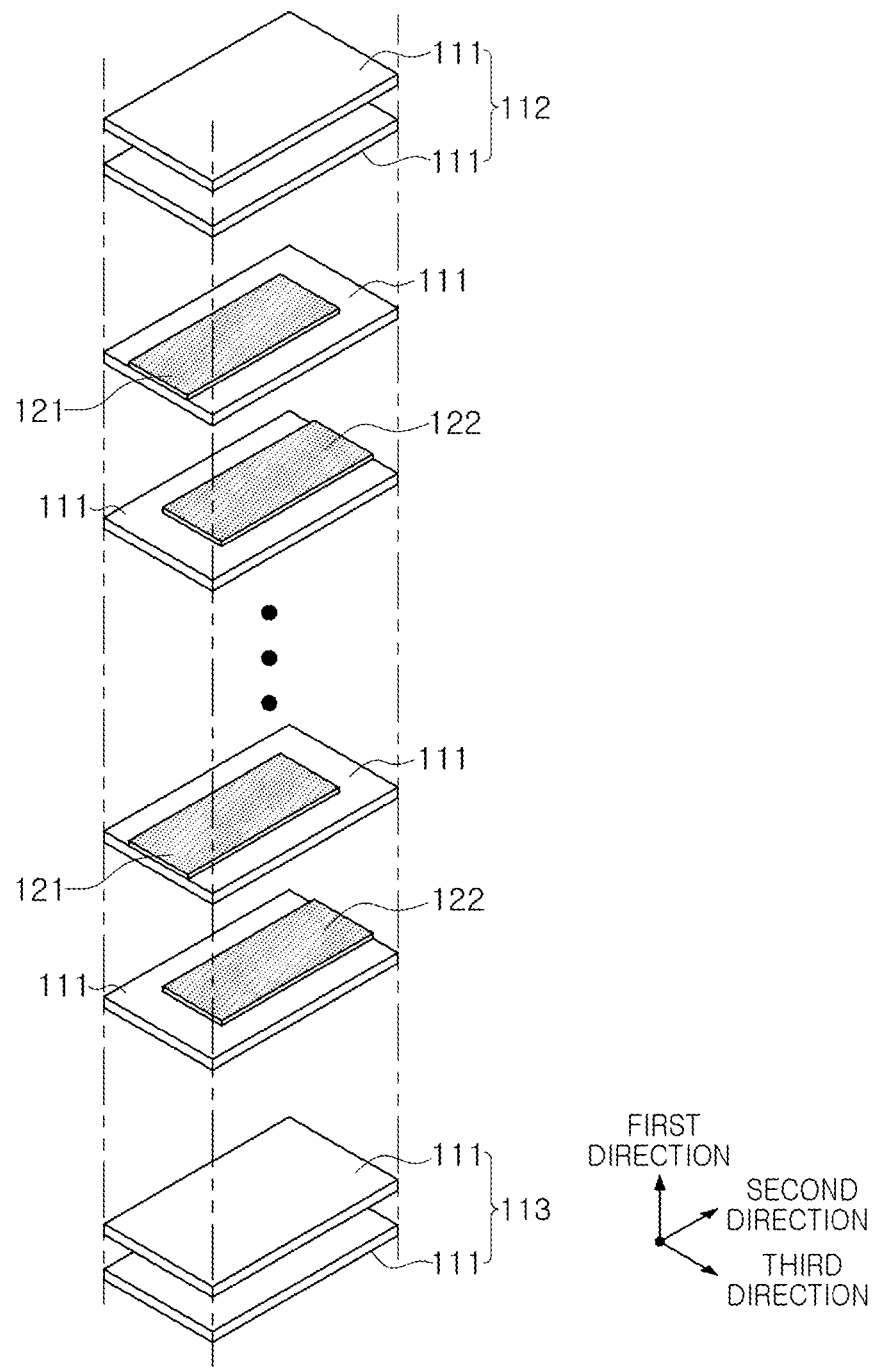
FIG. 4 is an exploded perspective view schematically illustrating an exploded body of a multilayer electronic component according to an embodiment.

FIG. 4 is an exploded perspective view schematically illustrating an exploded body of a multilayer electronic component according to an embodiment.

Figure 5:
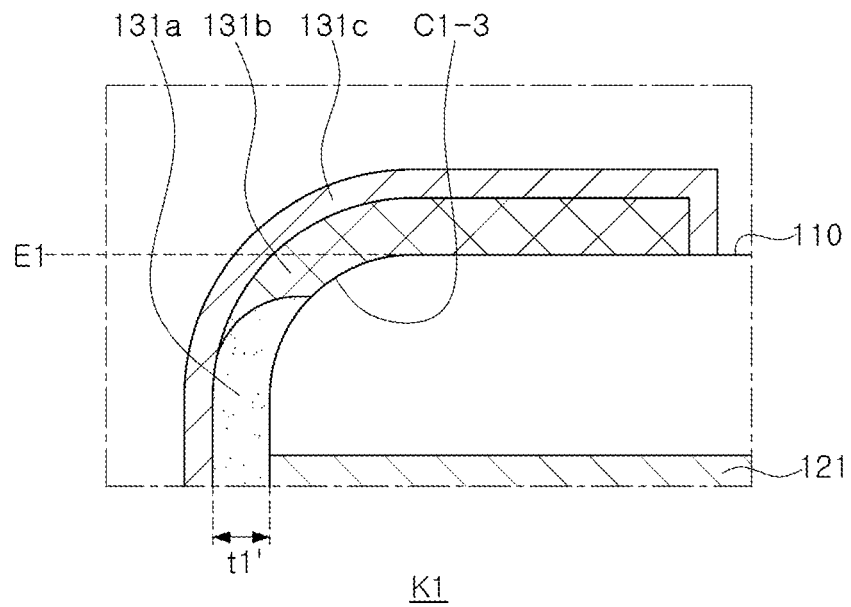
FIG. 5 is an enlarged view of region K1 of FIG. 2.

FIG. 5 is an enlarged view of region K1 in FIG. 2.

Figure 6:
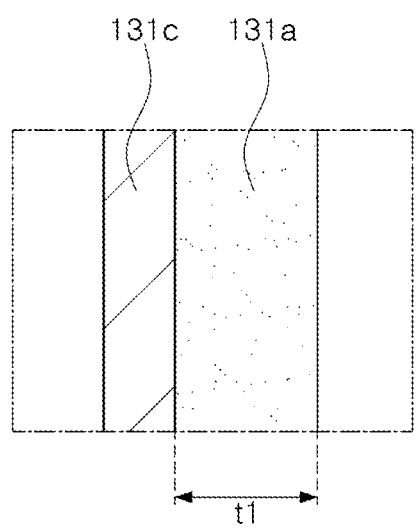
FIG. 6 is an enlarged view of region K2 of FIG. 2.

FIG. 6 is an enlarged view of region K2 of FIG. 2.

Figure 7:
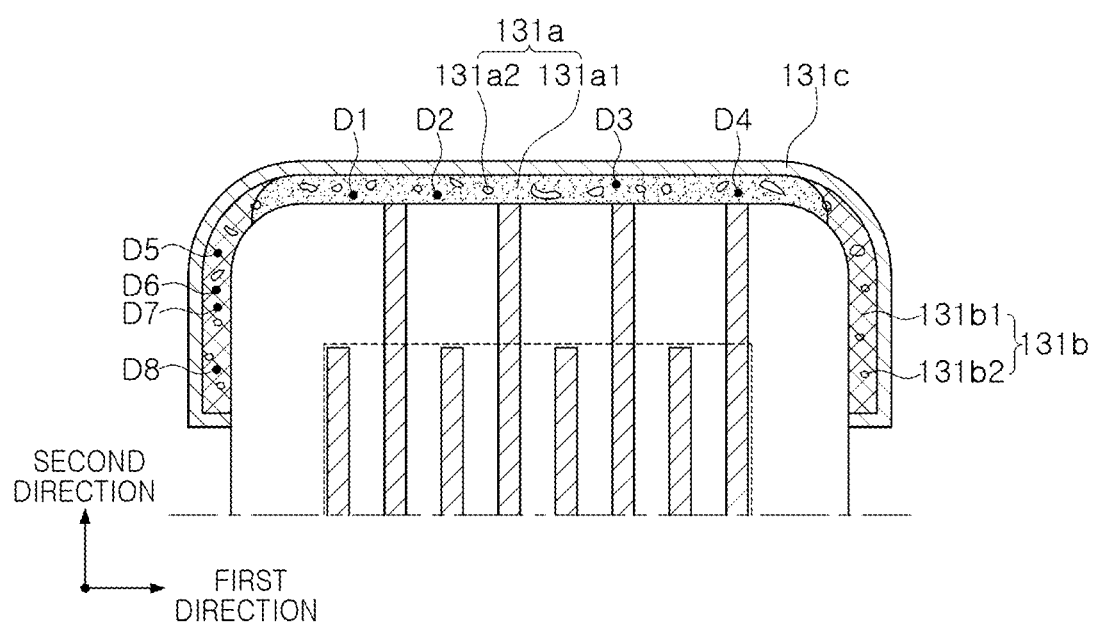
FIG. 7 is a cross-sectional view schematically illustrating a cross-section of an external electrode of a multilayer electronic component according to an embodiment.

FIG. 7 is a cross-sectional view schematically illustrating a cross-section of an external electrode of a multilayer electronic component according to an embodiment.

Referring to the drawings, a multilayer electronic component 100 according to an embodiment may include a body 110 including a dielectric layer 111 and first and second internal electrodes 121 and 122 alternately disposed with the dielectric layer interposed therebetween, and having first and second surfaces 1 and 2 opposing each other in the first direction, third and fourth surfaces 3 and 4 connected to the first and second surfaces and opposing each other in the second direction, and fifth and sixth surfaces 5 and 6 connected to the first to fourth surfaces and opposing each other in the third direction, a first external electrode 131 including a 1-1-th electrode layer 131a disposed on the third surface, and a 1-2-th electrode layer 131b disposed on the first and second surfaces and connected to the 1-1-th electrode layer, and a second external electrode 132 including a 2-1-th electrode layer 132a disposed on the fourth surface, and a 2-2-th electrode layer 132b disposed on the first and second surfaces and connected to the 2-1-th electrode layer.

The 1-2-th electrode layer 131b and the 2-2-th electrode layer 132b include Cu and a first additive element having a content lower than the Cu content, the content of the first additive element included in the 1-2-th electrode layer 131b is greater than the content of the first additive element included in the 1-1-th electrode layer 131a, the content of the first additive element included in the 2-2-th electrode layer 132b is greater than the content of the first additive element included in the 2-1-th electrode layer 132a, and the first additive element may be at least one selected from Ag and Al.

As described above, cracks may occur in the body of the multilayer electronic component due to external stress such as deformation of the substrate or the like, and thus moisture resistance and high-temperature reliability of the multilayer electronic component may be deteriorated. In addition, in the case in which a conductive resin layer is applied to external electrodes to protect the multilayer electronic component from external stress, the equivalent series resistance (ESR) may increase, resulting in a decrease in power efficiency of the multilayer electronic component or an increase in heat generation.

Meanwhile, in the case of the multilayer electronic component 100 according to an embodiment of the present disclosure, the first additive element having excellent ductility is included in the 1-2-th electrode layer 131b and the 2-2-th electrode layer 132b disposed on the mounting surface, and since the content of the first additive element included in the 1-2-th electrode layer 131b and the 2-2-th electrode layer 132b is greater than that of the 1-1-th electrode layer 131a and the 2-1-th electrode layer 132a, cracks may be prevented from occurring in the body 110 due to external stress, and accordingly, moisture resistance and high-temperature reliability of multilayer electronic components may be improved.

Hereinafter, respective components included in the multilayer electronic component 100 according to an embodiment will be described in more detail.

Although the detailed shape of the body 110 is not particularly limited, as illustrated, the body 110 may have a hexahedral shape or a shape similar thereto. Due to shrinkage of the ceramic powder included in the body 110 during the sintering process or polishing of the corners, the body 110 may not have a hexahedral shape with perfect straight lines, but may substantially have a hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3, and 4 and opposing each other in the third direction.

The body 110 may include a 1-3-th corner C1-3 connecting the first surface and the third surface, a 1-4 corner C1-4 connecting the first surface and the fourth surface, a 2-3-th corner C2-3 connecting the second and third surfaces, and a 2-4 corner C2-4 connecting the second and fourth surfaces. In addition, the body 110 may include a 1-5-th corner connecting the first surface and the fifth surface, a 1-6-th corner connecting the first surface and the sixth surface, a 2-5-th corner connecting the second surface and the fifth surface, and a 2-6-th corner connecting the second surface 2 and the sixth surface 6. The corner may have a round shape by rounding the corner connecting each side of the body 110 by performing a separate process. The first to sixth surfaces of the body 110 may be substantially flat surfaces, and non-flat areas may be viewed as corners.

In the body 110, dielectric layers 111 and internal electrodes 121 and 122 may be alternately stacked. The plurality of dielectric layers 111 forming the body 110 are in a sintered body, and a boundary between adjacent dielectric layers 111 may be unified to the extent that it is difficult to confirm without using a scanning electron microscope (SEM).

The dielectric layer 111 may be formed by preparing a ceramic slurry containing ceramic powder, an organic solvent and a binder, applying and drying the slurry on a carrier film to prepare a ceramic green sheet, and then sintering the ceramic green sheet. The ceramic powder is not particularly limited as long as sufficient capacitance may be obtained, but, for example, barium titanate-based ($BaTiO_3$)-based powder may be used.

The average thickness of the dielectric layer does not need to be particularly limited. On the other hand, to obtain miniaturization and high capacitance of the multilayer electronic component 100, the thickness of the dielectric layer 111 should be relatively thinned to increase the number of stacked layers. However, as the thickness of the dielectric layer 111 becomes thinner, cracks may easily occur in the body of the multilayer electronic component due to external stress, and thus, moisture resistance and high-temperature reliability of the multilayer electronic component may be deteriorated.

Meanwhile, in the case of a multilayer electronic component according to an embodiment of the present disclosure, the content of the first additive element included in the 1-2-th electrode layer 131b and the 2-2-th electrode layer 132b is greater than that of the 1-1-th electrode layer 131a and the 2-1-th electrode layer 132a, thereby preventing cracks from occurring in the body 110 due to external stress. As a result, even when the average thickness of the dielectric layer 111 is 0.4 μm or less, the moisture resistance reliability and high temperature reliability of the multilayer electronic component may be secured.

In this case, the average thickness of the dielectric layer may refer to the average thickness of the dielectric layer 111 disposed between the internal electrodes 121 and 122. The average thickness of the dielectric layer 111 may be measured by scanning a cross section of the body 110 in the first and second directions with a scanning electron microscope (SEM) at a magnification of 10,000. In more detail, an average value may be measured by measuring the thickness at a plurality of points of one dielectric layer 111, for example, at 30 points equally spaced in the second direction. The 30 equally spaced points may be designated in a capacitance forming portion Ac to be described later. In addition, when the average value is measured by extending this average value measurement to 10 dielectric layers 111, the average thickness of the dielectric layer 111 may be further generalized.

The internal electrodes 121 and 122 may be alternately disposed with the dielectric layer 111. For example, the first internal electrode 121 and the second internal electrode 122, which are a pair of electrodes having different polarities, may be disposed to face each other, with the dielectric layer 111 interposed therebetween. The plurality of first internal electrodes 121 and the plurality of second internal electrodes 122 may be electrically separated from each other by the dielectric layer 111 disposed therebetween.

The plurality of first internal electrodes 121 may be respectively spaced apart from the fourth surface 4 and connected to the third surface 3. In addition, the plurality of second internal electrodes 122 may be respectively spaced apart from the third surface 3 and connected to the fourth surface 4.

The conductive metal included in the internal electrodes 121 and 122 may be at least one of nickel (Ni), copper (Cu), palladium (Pd), silver (Ag), gold (Au), platinum (Pt), tin (Sn), tungsten (W), titanium (Ti) and alloys thereof, but the present disclosure is not limited thereto.

The internal electrodes 121 and 122 may be formed by applying a conductive paste for internal electrodes containing a conductive metal to a predetermined thickness on a ceramic green sheet and sintering the same. A screen-printing method or a gravure printing method may be used as a printing method of the conductive paste for internal electrodes, but the present disclosure is not limited thereto.

The average thickness of the internal electrode does not need to be particularly limited. In this case, the thickness of the internal electrodes 121 and 122 may refer to the size of the internal electrodes 121 and 122 in the first direction. On the other hand, in the case of a multilayer electronic component according to an embodiment, the content of the first additive element included in the 1-2-th electrode layer 131b and the 2-2-th electrode layer 132b is greater than that of the 1-1-th electrode layer 131a and the 2-1-th electrode layer 132a, and therefore, even when the average thickness of the internal electrodes 121 and 122 is 0.4 μm or less, the moisture resistance and high temperature reliability of the multilayer electronic component may be secured.

In this case, the average thickness of the internal electrodes may be measured by scanning a cross section of the body 110 in the first and second directions with a scanning electron microscope (SEM) at a magnification of 10,000. In more detail, the average value may be measured by measuring the thicknesses at a plurality of points of one internal electrode 121 or 122, for example, at 30 points equally spaced in the second direction. The 30 equally spaced points may be designated in a capacitance forming portion Ac to be described later. In addition, if the average value is measured by extending this average value measurement to 10 internal electrodes 121 and 122, the average thickness of the internal electrodes 121 and 122 may be further generalized.

The body 110 may include the capacitance forming portion Ac disposed inside the body 110 and including a plurality of first internal electrodes 121 and a plurality of second internal electrodes 122 disposed to face each other with the dielectric layer 111 interposed therebetween, to form the capacitance, and a first cover portion 112 and a second cover portion 113 disposed on both end surfaces of the capacitance forming portion Ac facing each other in the first direction. The cover portions 112 and 113 may basically serve to prevent damage to the internal electrodes due to physical or chemical stress. The cover portions 112 and 113 may have the same configuration as the dielectric layer 111 except that they do not include internal electrodes.

The average thickness of the cover portion does not need to be particularly limited. However, the average thickness of the cover portion may be 20 μm or less for miniaturization and high capacitance of the multilayer electronic component. As described above, even when the average thickness of the cover portion is 20 μm or less, since the content of the first additive element included in the 1-2-th electrode layer 131b and the 2-2-th electrode layer 132b is greater than that of the 1-1-th electrode layer 131a and the 2-1-th electrode layer 132a, reliability of the multilayer electronic component 100 may be secured.

The average thickness of the cover portion refers to the average thickness of each of the first cover portion 112 and the second cover portion 113. The average thickness of the cover portions 112 and 113 may refer to the average size of the cover portions 112 and 113 in the first direction, and may be an average value of sizes in the first direction measured at five equally spaced points in the cross section of the body 110 in the first and second directions.

The body 110 may include margin portions 114 and 115 disposed on both end surfaces of the capacitance forming portion Ac, facing each other in the third direction. For example, the margin portions 114 and 115 may refer to regions between both ends of the internal electrodes 121 and 122 and the boundary surface of the body 110 in the cross-section of the body 110 cut in the first and third directions. At this time, the margin portion may include a first margin portion 114 disposed on the fifth surface 5 of the body 110 and a second margin portion 115 disposed on the sixth surface 6 of the body 110.

The margin portions 114 and 115 may include the same material as the dielectric layer 111 except that the internal electrodes 121 and 122 are not included. The margin portions 114 and 115 may basically serve to prevent damage to the internal electrodes 121 and 122 due to physical or chemical stress.

The margin portions 114 and 115 may be formed by coating and sintering a conductive paste for internal electrodes on the ceramic green sheet, except where the margin portion is to be formed. Alternatively, to suppress the step difference caused by the internal electrodes 121 and 122, the margin portions 114 and 115 may also be formed by stacking a single dielectric layer or two or more dielectric layers on both end faces of the capacitance forming portion Ac, facing each other in the third direction.

The average thickness of the margin portions 114 and 115 does not need to be particularly limited. However, the average thickness of the margin portions 114 and 115 may be 20 μm or less for miniaturization and high capacitance of the multilayer electronic component. As described above, even when the average thickness of the margin portions 114 and 115 is 20 μm or less, the content of the first additive element included in the 1-2-th electrode layer 131b and the 2-2-th electrode layer 132b is greater than that of the 1-1-th electrode layer 131a and the 2-1-th electrode layer 132a. Therefore, moisture resistance and high temperature reliability of the multilayer electronic component 100 may be secured.

The average thickness of the margin portions 114 and 115 refers to the average thickness of each of the first margin portion 114 and the second margin portion 115. The average thickness of the margin portions 114 and 115 may refer to the average size of the margin portions 114 and 115 in the third direction, and may be an average value of sizes in the third direction measured at five equally spaced points in the cross section of the body 110 in the first and third directions.

The external electrodes 131 and 132 may be disposed on the third and fourth surfaces 3 and 4 of the body 110, and may include first external electrodes 131 and second external electrodes 132 connected to the plurality of first internal electrodes 121 and the plurality of second internal electrodes 122 respectively.

The first external electrode 131 may include a 1-1-th electrode layer 131a disposed on the third surface, a 1-2-th electrode layer 131b disposed on the first and second surfaces and connected to the 1-1-th electrode layer, and a 1-3-th electrode layer 131c disposed on the 1-1-th electrode layer and the 1-2-th electrode layer.

The second external electrode 132 may include a 2-1-th electrode layer 132a disposed on the fourth surface, a 2-2-th electrode layer 132b disposed on the first and second surfaces and connected to the 2-1-th electrode layer, and a 2-3-th electrode layer 132c disposed on the 2-1-th electrode layer and the 2-2-th electrode layer.

On the other hand, each of the 1-1-th electrode layer 131a, the 1-2-th electrode layer 131b, the 2-1-th electrode layer 132a, and the 2-2-th electrode layer 132b may include metal and glass. The glass may include at least one oxide among, for example, Ba, Ca, Zn, Al, B, and Si, but the present disclosure is not limited thereto. The glass included in the 1-1-th electrode layer 131a and the 1-2-th electrode layer 131b may serve to prevent moisture from penetrating into the body 110. In addition, the glass included in the 1-2-th electrode layer 131b and the 2-2-th electrode layer 132b may serve to improve bonding strength with the first and second surfaces 1 and 2 of the body 110.

In this case, in the cross section of the first external electrode 131 in the first and second directions, the area fraction of the glass included in the 1-1-th electrode layer 131a may be greater than the area fraction of the glass included in the 1-2-th electrode layer 131b. In the cross section of the second external electrode 132 in the first and second directions, the area fraction of the glass included in the 2-1-th electrode layer 132a may be greater than the area fraction of the glass included in the 2-2-th electrode layer 132b. Therefore, external moisture may be prevented from permeating into the internal electrodes 121 and 122 through the third and fourth surfaces, thereby improving moisture resistance reliability of the multilayer electronic component. When an external stress exceeding the deformation range is applied, the 1-2-th electrode layer 131b and the 2-2-th electrode layer 132b having a low area fraction of glass may be peeled off from the body 110, thereby preventing cracks from occurring in the body 110.

The area fraction of the glass included in the 1-1-th electrode layer 131a, the 1-2-th electrode layer 131b, the 2-1-th electrode layer 132b, and the 2-2-th electrode layer 132b may refer to an area ratio of the region where the glass is disposed with respect to the total area of the region where the metal is disposed and the region where the glass is disposed.

The area fraction may be measured, for example, by analyzing images of the first and second direction cross sections of the first and second external electrodes 131 and 132 cut at the third direction center of the body 110, taken with a scanning electron microscope (SEM). In this case, in the images, the area where the metal is disposed and the area where the glass is disposed may have different colors or shades, and therefore, the area fraction of glass included in the 1-1-th electrode layer 131a, the 1-2-th electrode layer 131b, the 2-1-th electrode layer 132b, and the 2-2-th electrode layer 132b may be measured.

In addition, in the 1-1-th electrode layer, the 1-2-th electrode layer, the 2-1-th electrode layer, and the 2-2-th electrode layer, the region where the metal is disposed and the region where the glass is disposed, may be distinguished from each other by analyzing components of images taken with the scanning electron microscope (SEM) using energy dispersive spectroscopy (EDS).

The 1-2-th electrode layer 131b and the 2-2-th electrode layer 132c may also be disposed on the fifth and sixth surfaces, and any one of the first surface, the second surface, the fifth surface, and the sixth surface may be amounting surface on which the multilayer electronic component 100 is mounted on a board.

The 1-2-th electrode layer 131b and the 2-2-th electrode layer 132c may include Cu and a first additive element in an amount smaller than the amount of Cu, and the first additive element may be at least one selected from Ag and Al. Cu and the first additive element are typical metal elements with excellent ductility. According to an embodiment, the 1-2-th electrode layer 131b and the 2-2-th electrode layer 132b disposed on the mounting surface include Cu and the first additive element having excellent ductility, thereby preventing cracks from occurring in the body 110 due to external stress caused by deformation of the substrate or the like.

On the other hand, the first additive element is superior in ductility to Cu, but if Ag is excessively added to the 1-2-th electrode layer 131b and the 2-2-th electrode layer 132b, sintering temperatures of the external electrodes 131 and 132 may be excessively low. Also, if Al is excessively added to the 1-2-th electrode layer 131b and the 2-2-th electrode layer 132b, the sintering temperature of the external electrodes 131 and 132 may become excessively high. Therefore, it may be preferable that the 1-2-th electrode layer 131b and the 2-2-th electrode layer 132b contain the first additive element in an amount smaller than the content of Cu.

For example, when the first additive element is Ag, the amount of Ag may be 8 moles or more and less than 50 moles based on 100 moles of the total content of Cu and Ag. If the content of Ag is less than 8 moles, phase separation of Ag may occur during the sintering process, and if the content of Ag is more than 50 moles, the sintering temperature may be excessively low.

For example, when the first additive element is Al, the Al content may be 5.65 moles or more and less than 50 moles based on 100 moles of the total content of Cu and Al. If the Al content is less than 5.65 mol, a stable phase between Cu and Al may not be formed, and in the case of 50 moles or more, the sintering temperature may be excessively high.

According to an embodiment, the content of the first additive element included in the 1-2-th electrode layer 131b is greater than the content of the first additive element included in the 1-1-th electrode layer 131a, and the content of the first additive element included in the 2-2-th electrode layer 132b may be greater than the content of the first additive element included in the 2-1-th electrode layer 132a.

Since the 1-2-th electrode layer 131b and the 2-2-th electrode layer 132b are disposed on the mounting surface, to prevent cracks from occurring in the body 110 due to external stress caused by deformation of the substrate, a relatively high content of the first additive element may be included. In addition, since the 1-1-th electrode layer 131a and the 2-1-th electrode layer 132a serve to connect the internal electrodes 121 and 122 and the external electrodes 131 and 132, it is enough to include a relatively low content of the first additive element, and accordingly, the 1-1-th electrode layer 131a and the 2-1-th electrode layer 132a may not include the first additive element, but the present disclosure is not limited thereto.

The content of the first additive element and the content of Cu included in the 1-2-th electrode layer 131b and the 2-2-th electrode layer 132b, and the content of the first additive element included in the 1-1-th electrode layer 131a and the 2-1-th electrode layer 132a may be measured by obtaining images of cross sections in the first and second directions of the first and second external electrodes 131 and 132 cut at the center of the body 110 in the third direction with a scanning electron microscope (SEM), and then by component analysis of the images by energy dispersive spectroscopy (EDS). In addition, the Cu content may refer to an atomic percentage (at %) measured by energy dispersive spectroscopy (EDS), and the content of the first additive element may refer to the total atomic percentage (at %) of the atomic percentage of Ag and the atomic percentage of Al.

At this time, the content of Cu included in the 1-2-th electrode layer 131b and the 2-2-th electrode layer 132b, and the content of the first additive element included in the 1-1-th electrode layer 131a, the 1-2-th electrode layer 131b, the 2-1-th electrode layer 132a and the 2-2-th electrode layer 132b may be measured in an area other than the glass.

For example, referring to FIG. 7, the content of the first additive element included in the 1-1-th electrode layer 131a may be measured in the area where the 1-1-th metal 131a1 is disposed, excluding the area where the 1-1-th glass 131a2 is disposed. In addition, the content of the first additive element included in the 1-1-th electrode layer 131a may be the content of the first additive element measured at an arbitrary point in the region where the 1-1-th metal 131a1 is disposed, but the present disclosure is not limited thereto, and the content of the first additive element included in the 1-1-th electrode layer 131a may also refer to the average value of the content of the first additive element measured at any 10 points (D1, D2, D3, D4, . . . ) of the 1-1-th metal 131a1.

In addition, the content of Cu and the content of the first additive element included in the 1-2-th electrode layers 131b may be measured in an area where the 1-2-th metal 131b1 is disposed, excluding the area where the 1-2-th glass 131b2 is disposed. In addition, the content of Cu and the content of the first additive element included in the 1-2-th electrode layers 131b may be the content of Cu and the content of the first additive element measured at any one point in the region where the 1-2-th metal 131b1 is disposed, but the present disclosure is not limited thereto. For example, the content of Cu and the content of the first additive element included in the 1-2-th electrode layers 131b may refer to the average value of the content of Cu and the average value of the content of the first additive element measured at any 10 points (D1, D2, D3, D4, . . . ) of the region where the 1-2-th metal 131b1 is disposed. In addition, since the first external electrode 131 may be in a symmetrical relationship with the second external electrode 132 in the second direction, the above description may be equally applied to the 2-1-th electrode layer 132a and the 2-2-th electrode layer 132b of the second external electrode 132.

Alternatively, in first and second direction cross sections of the first and second external electrodes 131 and 132 cut at the center of the body 110 in the third direction, the content of the first additive element and the content of Cu included in the 1-2-th electrode layer 131b and the 2-2-th electrode layer 132b, and the content of the first additive element included in the 1-1-th electrode layer 131a and the 2-1-th electrode layer 132a, may be measured in the remaining metal area after the glass is selectively etched and removed.

Since the 1-1-th electrode layer 131a and the 2-1-th electrode layer 132a serve to connect the internal electrodes 121 and 122 and the external electrodes 131 and 132, Cu having excellent connectivity with the internal electrodes 121 and 122 may be included, and in more detail, a metal containing Cu as a main component may be included. In this case, the main component refers to a component having the highest atomic percentage (at %).

In an embodiment, the 1-1-th electrode layer 131a and the 2-1-th electrode layer 132a further include a second additive element, and the second additive element may be at least one selected from Ni, Sn, Si, P, S, Cl, Zn, Ga, Ge, Se, Br, Nb, In, Sb, Te, I, Hf, Ta, W, Pt, Au, Pb and Bi. The second additive element may serve to lower the stabilization energy of hydrogen in a metal containing Cu as a main component, thereby preventing hydrogen generated during the plating process from penetrating into the body 110.

In an embodiment, the 1-1-th electrode layer 131a and the 2-1-th electrode layer 132a may be disposed between the extension line E1 of the first surface and the extension line E2 of the second surface. Accordingly, the capacitance per unit volume may be improved by reducing the size of the multilayer electronic component in the first direction. In this case, the extension line of each surface may refer to a line extended based on the flat part of each surface.

In an embodiment, the 1-1-th electrode layer 131a includes a region not covered by the 1-2-th electrode layer 131b on the third surface, and the 2-1-th electrode layer 132a may include a region not covered by the 2-2-th electrode layer 132b on the fourth surface. As a result, the thickness of the first external electrode 131 disposed on the third surface may be reduced, and the thickness of the second external electrode 132 disposed on the fourth surface may be reduced. As a result, the capacitance per unit volume may be improved by reducing the size of the multilayer electronic component 100 in the second direction.

On the other hand, the boundary between the 1-1-th electrode layer 131a and the 1-2-th electrode layer 131b may be distinguished from mapping images of the first and second additive elements obtained by analyzing the cross section in the first and second directions of the first external electrode 131 cut from the center of the body 110 in the third direction with SEM-EDS. For example, since the 1-2-th electrode layer 131b may have a higher content of the first additive element than the 1-1-th electrode layer 131a, and the 1-1-th electrode layer 131a may have a higher content of the second additive element than the 1-2-th electrode layer 131b, the boundary between the 1-1-th electrode layer 131a and the 1-2-th electrode layer 131b may be a point where the distribution of the first and second additive elements rapidly changes.

In addition, the boundary between the 2-1-th electrode layer 132a and the 2-2-th electrode layer 132b may be a point where the distribution of the first and second additive elements rapidly changes in the mapping images of the first and second additive elements obtained by analyzing the cross section in the first and second directions of the second external electrode 131 cut from the center of the body 110 in the third direction by SEM-EDS.

The 1-1-th electrode layer 131a and the 2-1-th electrode layer 132a may be formed, for example, by applying a first conductive paste containing Cu powder and glass to the third and fourth surfaces and then sintering the same. In addition, the first conductive paste may include the first additive element powder and/or the second additive element powder.

In addition, the 1-2-th electrode layer 131b and the 2-2-th electrode layer 132b may be formed by applying a second conductive paste containing Cu powder and a first additive element powder having a content lower than the content of the Cu powder on the first, second, fifth, and sixth surfaces, and then sintering the paste.

The 1-3-th electrode layer 131c and the 2-3-th electrode layer 132c may improve mounting characteristics. The types of the 1-3-th electrode layer and the 2-3-th electrode layer are not particularly limited, and may be a plating layer including Ni, Sn, Pd, and/or alloys including the same, and may be formed of a plurality of layers.

The 1-3-th electrode layer 131c and the 2-3-th electrode layer 132c may be, for example, a Ni plating layer or a Sn plating layer, and may have a form in which the Ni plating layer and the Sn plating layer are sequentially formed. In addition, the 1-3-th electrode layer 131c and the 2-3-th electrode layer 132c may include a plurality of Ni plating layers and/or a plurality of Sn plating layers.

Hereinafter, a multilayer electronic component according to another embodiment will be described. However, the multilayer electronic component according to an embodiment may have the same configuration as the above-described multilayer electronic component according to the embodiment. Therefore, description overlapping with the above-described embodiment will be omitted.

A multilayer electronic component 100 according to another embodiment may include a body 110 including a dielectric layer 111 and first and second internal electrodes 121 and 122 alternately disposed with the dielectric layer interposed therebetween, and having first and second surfaces 1 and 2 opposing each other in the first direction, third and fourth surfaces 3 and 4 connected to the first and second surfaces and opposing each other in the second direction, and fifth and sixth surfaces 5 and 6 connected to the first to fourth surfaces and opposing each other in the third direction, a first external electrode 131 including a 1-1-th electrode layer 131a disposed on the third surface, and a 1-2-th electrode layer 131b disposed on the first and second surfaces and connected to the 1-1-th electrode layer, and a second external electrode 132 including a 2-1-th electrode layer 132a disposed on the fourth surface, and a 2-2-th electrode layer 132b disposed on the first and second surfaces and connected to the 2-1-th electrode layer. The 1-1-th electrode layer 131a and the 2-1-th electrode layer 132a are disposed between the extension line E1 of the first surface and the extension line E2 of the second surface, the 1-1-th electrode layer 131a includes a region not covered by the 1-2-th electrode layer 131b on the third surface, the 2-1-th electrode layer 132a includes a region not covered by the 2-2-th electrode layer 132b on the fourth surface, and each of the 1-2-th electrode layer 131b and the 2-2-th electrode layer 132b may include at least one of Ag and Al.

As described above, the 1-1-th electrode layer 131a and the 2-1-th electrode layer 132a are disposed between the extension line E1 of the first surface and the extension line E2 of the second surface, and thus, capacitance per unit volume may be improved by reducing the size of the multilayer electronic component in the first direction. In this case, the extension line of each surface may refer to a line extended based on the flat part of each surface.

In addition, the 1-1-th electrode layer 131a includes a region not covered by the 1-2-th electrode layer 131b on the third surface, and the 2-1-th electrode layer 132a includes a region not covered by the 2-2-th electrode layer 132b on the fourth surface, thereby reducing the thickness of the first external electrode 131 disposed on the third surface and reducing the thickness of the second external electrode 132 disposed on the fourth surface. As a result, the capacitance per unit volume may be improved by reducing the size of the multilayer electronic component 100 in the second direction.

In addition, the 1-2-th electrode layer 131b and the 2-2-th electrode layer 132b disposed on the mounting surface include at least one of Ag and Al having superior ductility than Cu, thereby preventing cracks from occurring in the body 110 due to external stress caused by deformation of the substrate. As a result, a multilayer electronic component having excellent moisture resistance and high temperature reliability may be provided.

As set forth above, according to an embodiment, cracks may be prevented from occurring in the body due to external stress.

Moisture resistance reliability of multilayer electronic components may be improved.

Hydrogen generated in the plating process may be prevented from penetrating into the body.

The present disclosure is not limited by the above-described embodiments and accompanying drawings, but is intended to be limited by the appended claims. Therefore, various forms of substitution, modification and change will be possible by those skilled in the art within the scope of the technical spirit of the present disclosure described in the claims, and this will also be said to fall within the scope of the present disclosure.

In addition, the expression 'an embodiment' does not indicate the same embodiment, and is provided to emphasize and describe different unique characteristics. However, the embodiments presented above are not excluded from being implemented in combination with features of another embodiment. For example, even if a matter described in one specific embodiment is not described in another embodiment, it may be understood as a description related to another embodiment, unless there is a description to the contrary or contradicting the matter in another embodiment.

In addition, expressions such as first and second are used to distinguish one component from another, and do not limit the order and/or importance of the components. In some cases, without departing from the scope of rights, a first element may be named a second element, and similarly, a second element may be named a first element.

While embodiments have been illustrated and described above, it will be apparent to those skilled in the art that modifications and variations could be made without departing from the scope of the present disclosure as defined by the appended claims.

What is claimed is:

1. A multilayer electronic component comprising:
a body including a dielectric layer and first and second internal electrodes alternately disposed with the dielectric layer interposed therebetween, and having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction;
a first external electrode including a 1-1-th electrode layer disposed on the third surface, and a 1-2-th electrode layer disposed on the first and second surfaces and connected to the 1-1-th electrode layer; and
a second external electrode including a 2-1-th electrode layer disposed on the fourth surface and a 2-2-th electrode layer disposed on the first and second surfaces and connected to the 2-1-th electrode layer,
wherein the 1-2-th electrode layer and the 2-2-th electrode layer include Cu and a first additive element having a content lower than a content of the Cu,
the content of the first additive element included in the 1-2-th electrode layer is greater than the content of the first additive element included in the 1-1-th electrode layer, and the content of the first additive element included in the 2-2-th electrode layer is greater than the content of the first additive element included in the 2-1-th electrode layer, and
the first additive element is at least one selected from Ag or Al.

2. The multilayer electronic component of claim 1, wherein the 1-1-th electrode layer and the 1-2-th electrode layer contain Cu.

3. The multilayer electronic component of claim 2, wherein the 1-1-th electrode layer and the 2-1-th electrode layer further include a second additive element,
wherein the second additive element is at least one selected from Ni, Sn, Si, P, S, Cl, Zn, Ga, Ge, Se, Br, Nb, In, Sb, Te, I, Hf, Ta, W, Pt, Au, Pb or Bi.

4. The multilayer electronic component of claim 1, wherein each of the 1-1-th electrode layer, the 1-2-th electrode layer, the 2-1-th electrode layer, and the 2-2-th electrode layer contains glass.

5. The multilayer electronic component of claim 4, wherein the content of Cu included in the 1-2-th electrode layer and the 2-2-th electrode layer, and the content of the first additive element included in the 1-1-th electrode layer, the 1-2-th electrode layer, the 2-1-th electrode layer, and the 2-2-th electrode layer, are measured in an area excluding the glass.

6. The multilayer electronic component of claim 4, wherein in a cross section of the first external electrode in the first and second directions, an area fraction of the glass included in the 1-1-th electrode layer is greater than an area fraction of the glass included in the 1-2-th electrode layer, and
in a cross section of the second external electrode in the first and second directions, an area fraction of the glass included in the 2-1-th electrode layer is greater than an area fraction of the glass included in the 2-2-th electrode layer.

7. The multilayer electronic component of claim 1, wherein the 1-1-th electrode layer and the 2-1-th electrode layer are disposed between an extension line of the first surface and an extension line of the second surface.

8. The multilayer electronic component of claim 1, wherein the 1-1-th electrode layer includes a region not covered by the 1-2-th electrode layer on the third surface, and
the 2-1-th electrode layer includes a region not covered by the 2-2-th electrode layer on the fourth surface.

9. A multilayer electronic component comprising:
a body including a dielectric layer and first and second internal electrodes alternately disposed with the dielectric layer interposed therebetween, and having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction;
a first external electrode including a 1-1-th electrode layer disposed on the third surface, and a 1-2-th electrode layer disposed on the first and second surfaces and connected to the 1-1-th electrode layer; and
a second external electrode including a 2-1-th electrode layer disposed on the fourth surface, and a 2-2-th electrode layer disposed on the first and second surfaces and connected to the 2-1-th electrode layer,
wherein the 1-1-th electrode layer is disposed on an area of the third surface specified between an extension line of the first surface in the second direction and an extension line of the second surface in the second direction, and the 2-1-th electrode layer is disposed on an area of the fourth surface which is specified between the extension line of the first surface and the extension line of the second surface,
the 1-1-th electrode layer includes a region not covered by the 1-2-th electrode layer on the third surface, the 2-1-th electrode layer includes a region not covered by the 2-2-th electrode layer on the fourth surface, the 1-2-th electrode layer and the 2-2-th electrode layer each contain at least one of Ag or Al, and the 1-2-th electrode layer overlaps the 1-1-th electrode layer in the second direction, or the 2-2-th electrode layer overlaps the 2-1-th electrode layer in the second direction.

10. The multilayer electronic component of claim 9, wherein each of the 1-1-th electrode layer and the 2-1-th electrode layer further includes at least one of Ni, Sn, Si, P, S, Cl, Zn, Ga, Ge, Se, Br, Nb, In, Sb, Te, I, Hf, Ta, W, Pt, Au, Pb or Bi.

11. The multilayer electronic component of claim 9, wherein the 1-1-th electrode layer, the 1-2-th electrode layer, the 2-1-th electrode layer, and the 2-2-th electrode layer each contains glass.

12. The multilayer electronic component of claim 11, wherein in a cross section of the first external electrode in the first and second directions, an area fraction of the glass of the 1-1-th electrode layer is greater than an area fraction of the glass of the 1-2-th electrode layer, and in a cross section of the second external electrode in the first and second directions, an area fraction of the glass of the 2-1-th electrode layer is greater than an area fraction of the glass of the 2-2-th electrode layer.

* * * * *